March 10, 1964 R. HELL ETAL 3,124,036

METHOD AND APPARATUS FOR MULTICOLOR PRINTING

Filed Dec. 14, 1959 4 Sheets-Sheet 1

Inventors:
Rudolf Hell, Fritz-Otto Zeyen,
Hans Keller and
Eberhard Hennig
By: Michael S. Striker
Attorney Inventors:
Rudolf Hell, Fritz-Otto Zeyen
Hans Keller and
Eberhard Hennig
by Michael S. Striker
Attorney

METHOD AND APPARATUS FOR MULTICOLOR PRINTING

Filed Dec. 14, 1959 4 Sheets-Sheet 3

Inventors
Rudolf Hell, Fritz-Otto Zeyen
Hans Keller and
Eberhard Hennig
By: Michael S. Striker
Attorney INVENTORS
Rudolf Hell, Fritz-Otto Zeyen
Hans Keller and
BY Eberhard Hennig
Michael S. Striker
Attorney 3,124,036

METHOD AND APPARATUS FOR MULTICOLOR PRINTING

Rudolf Hell and Hans Keller, Kiel, Fritz-Otto Zeyen, Heikendorf, near Kiel, and Eberhard Hennig, Ascheberg, Germany, assignors to Dr.-Ing. Rudolf Hell, Kiel K.G., Kiel, Germany Filed Dec. 14, 1959, Ser. No. 859,276
Claims priority, application Japan Nov. 4, 1959
19 Claims. (Cl. 88—24)

This invention relates to method and apparatus for reproducing multi-color prints from a master or pattern subject picture. More particularly the present invention relates to photo-electric means and method for controlling the color content and gradation of the reproduced copy.

Photoelectric process of multicolor picture reproduction of the general character contemplated by the present invention is known in the art. The usual approach is to provide a transparent or reflective master picture, which is illuminated so as to control the intensity of the transmitted or reflected light incident on photo cells. The master picture is subjected to point by point photoelectric scanning, and the derived light is channeled in three or four color channels, which generate electrical signals in accordance with the intensity and color of the elemental subject pattern instantly scanned. The signals, in amplified form ultimately actuate suitable reproducing means in the individual channels. Such reproducing means may assume the form of so-called recording lamps or "glow lamps" for printing of the individual photographic color extracts from the respective color channels. Another form of reproducing means is electronic apparatus for engraving of the extract color including, at the output end thereof, an engraving needle.

The photoelectric signals obtained in the individual extracting channels cannot be employed to control the reproducing means without modification. The extracting means principally, and also the photo cells and the reproducing means have non-uniform spectral responses. This necessitates proper weighting and correction of the photo electric signals, so that the printed copy shall be a faithful reproduction of the original subject. Physiological response of the eye also contributes to the requirement for color weighting.

The method and means employed by the prior art for achieving the above objectives are of rather complex nature. Also the so-called "black extraction," which will be described more fully hereinafter has not been very satisfactory in the respect of failing to provide faithful reproduction which is pleasing to the eye.

It is a general object of the present invention to overcome the disadvantages of the prior art approaches.

A more specific object of the present invention is the provision of simple, efficient and economic method and means for deriving and correcting or weighting electronically the color extract signals which ultimately control the reproducing means.

A still further object of the invention is the provision of black extracting means which effect faithfully reproduced copy of a quality pleasing to the eye.

Other objects, advantages and novel features of the invention will be apparent from the following more detailed description, of which the appended claims form a part, when considered together with the accompanying drawings, in which:

The color extracts contemplated herein are red, yellow, blue, and optionally black, as in the prior art. The master or pattern picture may contain, in addition to white and black the primary colors red, yellow and blue, and also their principal mixture colors orange, green and violet. If a red extract is to be made from these colors, red must be printed with full intensity in the presence of the pattern colors red, orange, violet and black. These pattern colors are therefore referred to as "quasi-black colors" or simply "black colors." Correspondingly, in the presence of the pattern colors white, yellow, green or blue, the reproduction must not be printed red. The latter pattern colors are accordingly referred to as "quasi-white colors" or simply "white colors." The black colors of the present example contain red and therefore do not reflect green spectral light and appear black at the rear of a green filter, but to varying extent. The white colors reflect green, but not completely and therefore are transmitted to varying extent by the green filter. The variations of the white color intensities are great, and in general greater than the variations of the black color intensity. Therefore the correction of the white colors is of primary importance in all the color weighting situations encountered. The apparatus of FIG. 1 is based on these theoretical considerations.

Figure 1:
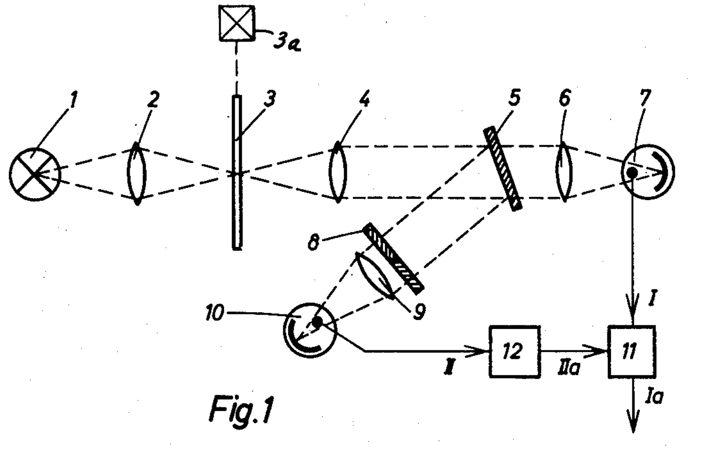
FIG. 1 is a schematic drawing illustrative of the principal color weighting means and method in accordance with the invention.

Referring to FIG. 1, a luminous point source 1 emits a beam of light which is focused by means of a lens on the transparent pattern picture object 3. To the end of providing point by point and line by line scanning of the pattern 3, means *3a* reciprocates the pattern 3 in a plane perpendicular to that of the paper and also advances the same in a vertical direction in each reciprocating cycle. Scanning drive means *3a* is of a type well known in the art and is described in detail in Patent 2,185,139, granted to Wurzberg on December 26, 1939. Alternatively, well-known rotary drum-type means may be employed for imparting relative motion as between the object 3 and the scanning light beam. It should also be understood that the arrangement is similar in the case of reflective rather than transmissive pattern pictures 3 except that the elements *1a* and 2 or elements corresponding thereto would be provided to the right of the master copy 3 rather than to its left.

Upon emergence from the master copy 3, the divergent light beam is refracted to a parallel beam by means of a second lens 4. The parallel beam strikes a filter 5 of a selected color depending upon the desired extraction, as explained below. The filter 5 is arranged obliquely with respect to the incident light, and accordingly partly transmits the incident light to a third lens 6 and partly reflects the same on to a second color filter 8 to varying extent depending on the spectral content of the scanned elemental picture.

The lens 6 converges the transmitted light onto a photocell 7, which delivers a signal potential I to a modulator stage 11. The signal amplitude varies in accordance with the luminous intensity sensed by the photocell 7. The modulator 11 delivers an output signal I*a* which corresponds to its input signal I reduced in amplitude in accordance with the amplitude of a second, corrective or weighting signal II*a* applied thereto. The modulator may, for example, include an input pentode stage whose control grid receives signal I and whose suppressor grid receives signal II*a*. The output signal I*a* may be utilized to control suitable reproducing means of the type previously mentioned, the latter operating in synchronism with the scanning drive means 3a in well known manner to print a copy of the master object 3.

The filter 8 may be composed of two or more adjacent partial color filters in accordance with the desired color extract, as will appear in Table I. Light transmitted by filter 8 is focused by means of a further lens 9 on a second photocell 10, which delivers an output signal potential II in accordance with the received light intensity to an amplifier 12, which produces the above-mentioned signal IIa. The output signal Ia is a non-linear function of the signals I and II; the non-linearity is of logarithmic nature as will be apparent from a consideration of FIGS. 2 and 3. To this end, either the modulator 11 is linear and the amplifier 12 non-linear, or vice versa.

The combinations of colors required for the color extract filter 5 and the color correction filter 8 are tabulated as follows:

*Table I*

| Color Extract | Filter 5 | Filter 8 |
|---|---|---|
| Red | Green | Blue-Red (Red dominant, blue secondary). |
| Yellow | Blue | Yellow-Blue green. |
| Blue | Red | Blue-green. |
| Black | Green-blue | Red. |

Figure 2:
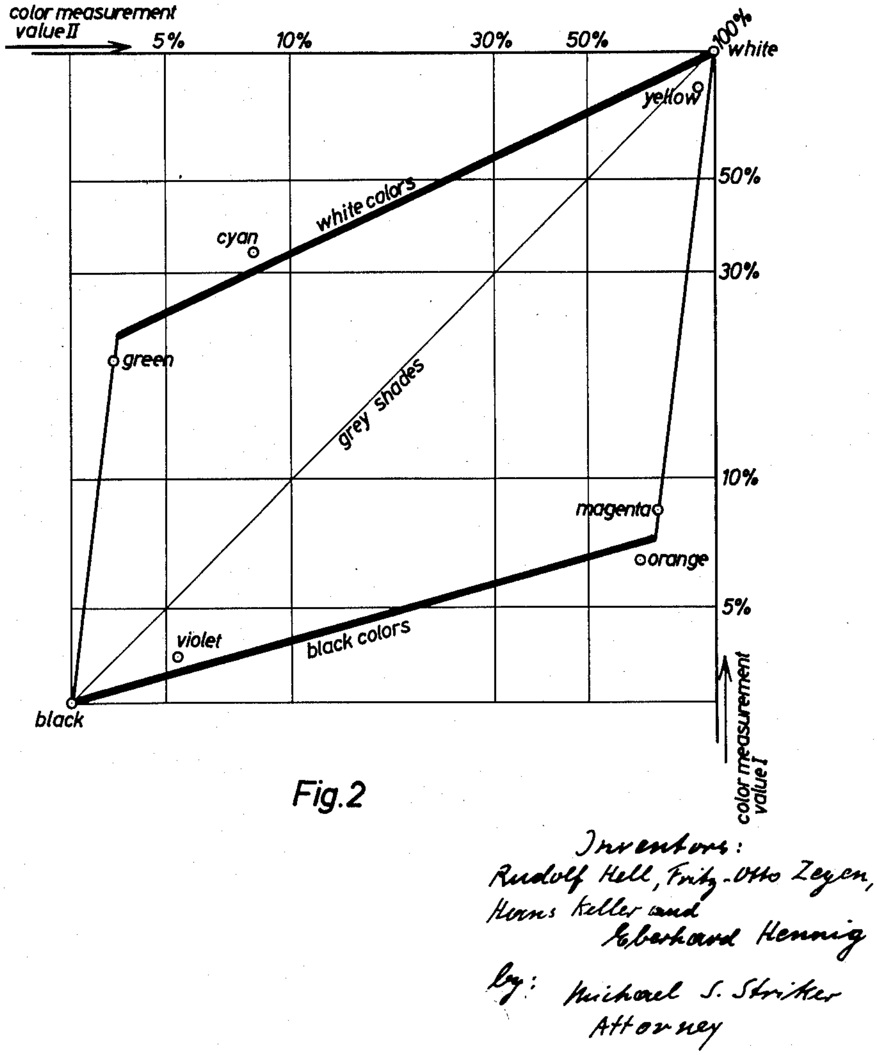
FIGS. 2 and 3 are graphs representing color intensity or value distributions representative of the performance of the apparatus of FIG. 1.
Figure 3:
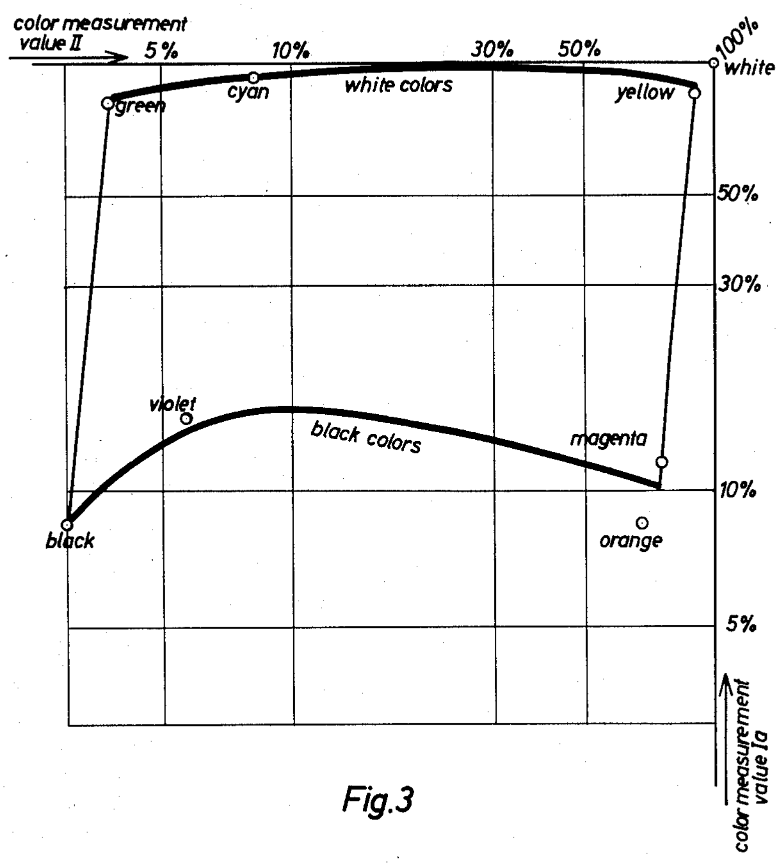

FIGS. 2 and 3, which are drawn to logarithmic scale serve to illustrate graphically the performance of the apparatus of FIG. 1. The loci of the most important primary colors and their principal mixture colors are presented in FIGS. 2 and 3 for the case of red color extraction. Similar diagrams will apply to the other color extracts. In FIG. 2, the uncorrected response is presented, i.e. the relative amplitudes or "color values" of the signals I and II. It is readily seen that the plots for the "white colors" and of the "black colors" are very nearly straight lines (on a logarithmic scale). The amplitudes of the white colors vary to substantially greater extent than those of the black colors, as previously stated. The non-linearity introduced by the units 11 and 12 is of a nature so as to render the amplitudes of the white colors substantially constant, as illustrated in FIG. 3, which is a plot of the color values of the signal Ia and II. The black colors are not as yet of uniform amplitude; this is not objectionable in some applications. However, in accordance with another aspect of the invention, the black colors may also be brought to uniform levels, without disturbing the substantially uniform level of the white colors, and without increasing the number of photocells. It is to be noted that but two photocells, namely 7 and 10 are employed as contrasted to three photocells of the apparatus of the prior art.

The nature of the black color correction is determined by the particular application. Generally, the uncorrected pattern color which corresponds to the extract color, will always be somewhat brighter than black, so that in the reproduction thereof the color is printed in insufficient amount. Thus, with respect to reflective master pictures, it will be found that blue is too bright in the blue extraction, while in transparent master patterns, red and yellow are too bright in the red and yellow extractions respectively. Reference is again made to the plot of the black colors of FIG. 2, for the case of red extract. The white color correction produces some improvement with respect to the black colors as well (FIG. 3) but further leveling of the black colors may be desirable in many applications.

Figure 4:
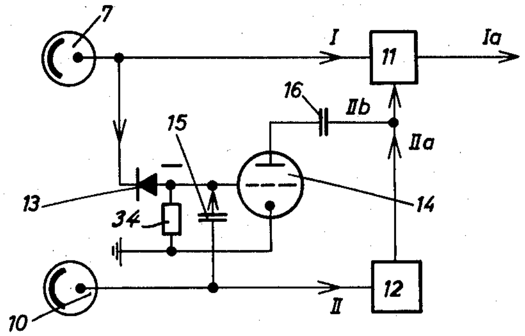
FIGS. 4 to 7 are schematic drawings of modifications of the apparatus of FIG. 1, providing additional color correction.

The circuitry of FIG. 4 is suitable to provide the required supplemental black color correction for three color printing, especially in the case of reproduction of transparent pattern pictures. Such circuitry includes all the circuitry of FIG. 1, but for simplicity the elements in back of the photocells 7 and 10 are omitted. The arrangement of FIG. 4 takes advantage of the interrelation of the uncorrected color values of the black colors and white colors as illustrated in FIG. 2, to provide an additional correction signal IIb to the amplifier 11. Signal IIb is generated as a joint function of signal I derived from the picture or extract channel and of signal II derived from the correction channel. The signal II is applied through a capacitor 15 to the grid of triode 14 functioning as a limiter of blocking stage. The plate output signal of the triode serves as the supplemental black color correction signal, and is applied to stage 11 through a capacitor 16. It should be appreciated that the circuitry of triode 14 is shown in simplified fashion, the usual plate load resistor and power supply being omitted. The limiting level of the triode 14 is variable and is determined by the amplitude of signal I, which is applied through the cathode and then the anode of a diode rectifier 13 to the grid of the triode and also via the resistor 34 to ground, the cathode of the triode also being grounded. Thus the greater the amplitude of the signal I, the greater the negative bias applied to the grid of tube 14 and the lower the threshold level for limiting or blocking of the signal II. The arrangement is such that when signal I is greater than 15% of the "white" potential, stage 14 blocks and no additional corrective signal IIb is applied to stage 11. When the color value I drops below 15%, signal IIb is fed to stage 11 with an amplitude corresponding to that of signal II. The nature of the control effect of signal IIb on stage 11 is the same as that of IIa. Accordingly, the effect of signal IIb is to lower the amplitude of the black colors in the picture channel to the amplitude of black.

The generation of the signal IIb as a function of the correction signal II is particularly advantageous because of simplicity but is not the only manner of its generation. Alternatively signal IIb could be generated as a function of signal IIa or possibly of the output signal Ia, as the signals Ia, II, IIa and IIb are interrelated in predetermined relation. Also, instead of lowering the amplitude of the black colors in the picture channel to the amplitude of black, conversely the amplitude of the black colors could be raised to the peak of the black colors.

Four color printing presents different supplemental correction requirements. One approach of the prior art had been to provide red, green, blue, and black color extracts and print four layers in the presence of a black pattern. In order to reduce this requirement, it had been the practice to derive the black contribution more or less completely from the red, green, and blue color extract. This, however, necessitates simultaneous presence of all three uncorrected color extracts. This latter approach is not suitable in the present case, as in the invention, only two photocells are available, of which only one delivers an uncorrected color extract, which necessarily is that of but a single color at a time. Nevertheless, the conversion to four color extracts is still feasible, and this is a further advantage of the invention. The conversion is restricted to picture elements having high black content in the master pattern. Again, it is necessary to decrease the extract content of the three colors in the direction towards white. As may be seen in FIG. 2, a good criterion for the presence of black or gray is the equality of the color values I and II, as represented by the "gray tones" diagonal. The more the color values I and II approach one another, the more the required reduction in the color value Ia. Circuitry for producing this result is illustrated in FIG. 5, to which reference is now made.

Figure 5:
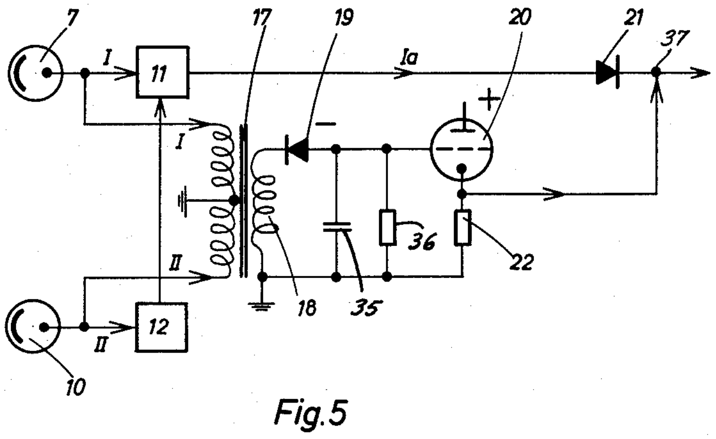

The circuitry of FIG. 5 is intended to include the circuitry of FIG. 1, but in the interest of simplicity, the elements in back of the photocells 7 and 10 are omitted. The output signals I and II are applied to the stages 11 and 12 respectively, as previously, and are additionally applied to the ends of the primary winding of a transformer 12 in opposing relation. The center tap of the primary winding is grounded. The secondary winding 13 of the transformer is grounded at its lower end, while its upper end connects through the cathode and then the anode of a rectifier diode 19 to the grid of a cathode follower stage 20. Shunt connected capacitor 35 and resistor 36 interconnect the grid and ground to provide a charging network for rectifier 19. Resistor 22 serves as cathode load resistor for the cathode follower 20, whose cathode is connected to a circuit junction 37 to which is also applied the output signal I*a* in positive rectified form by means of the diode rectifier 21 linking stage 11 and the terminal 37.

The circuitry of FIG. 5 functions as follows. When the differential of the color values I and II is large, diode 19 provides a rectified negative potential of a magnitude sufficiently great to cut off the cathode follower 20. In this case, the rectified potential I*a* at the junction 37 is unaffected. At the other extreme, when the potentials I and II are the same, the grid voltage of the cathode follower 20 is zero. The potential of the junction 37 is now determined jointly by the conductive state of the cathode follower and the magnitude of the output of stage 11, and will be less than in the previous case and in that sense corrected. The corrective effect intermediate of these two extremes varies according to the magnitude of the difference voltage provided by winding 18. If desired, this difference voltage may be augmented by a small fraction of the voltage II. In this case, the cathode follower 20 will block even in the presence of bright gray values, thereby limiting the correction or "base color removal" to the darker black containing colors.

Figure 7:
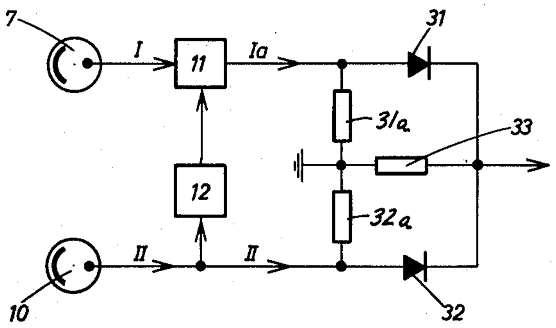
Figure 8:
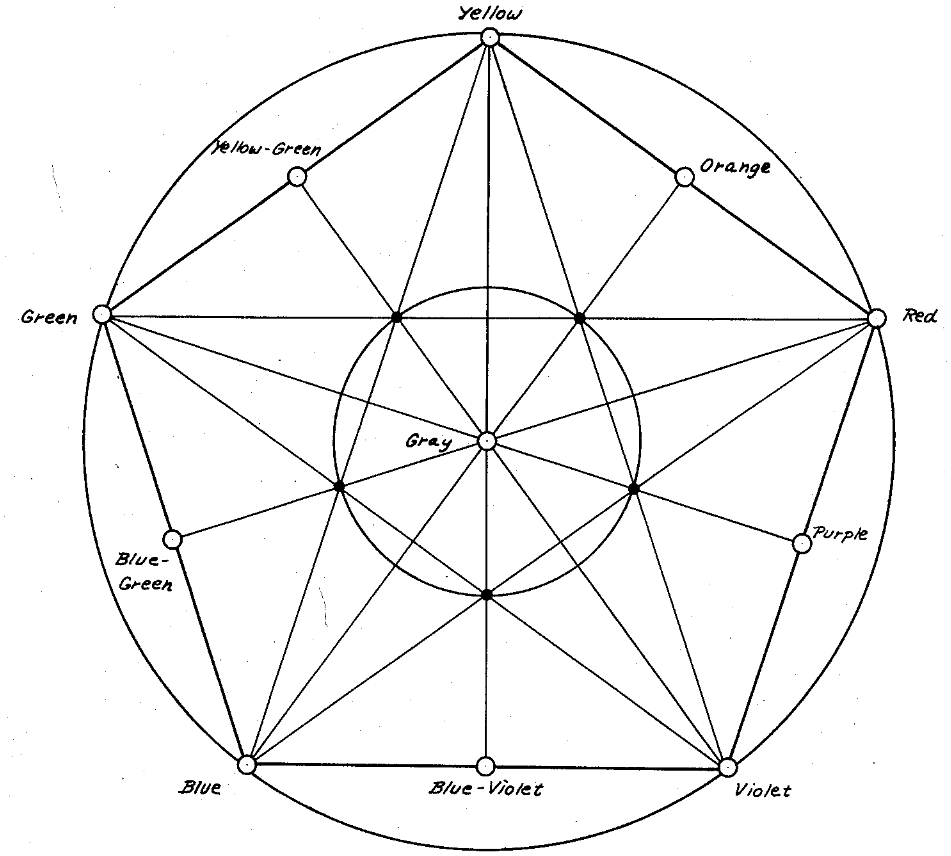
FIG. 8 is a color circle diagram representative of the performance of the apparatus of FIG. 6.

A supplemental color correction of a further different type is dictated by certain physiological effects which require balance of the extract color parts in both semicircles defined by the diameter linking the extract color and its complementary on the color circle illustrated in FIG. 8. To achieve such balance, it is necessary, to provide different corrections for the black colors and white colors. This is realized according to a further aspect of the invention, by the provision, in the correction channel of color filters whose spectral transmission is variable and adjustable on a continuous basis or in discrete steps. Such provision may be made in any one of the arrangements of the FIGS. 4, 5, or 7. As applied to the example of the production of the red extract, the realization of the color balance requires that the correction channel filter balances the red content as between the colors yellow and orange on the one hand and the colors blue and violet on the other hand. One suitable embodiment is illustrated in FIG. 6, to which reference is now made.

Figure 6:
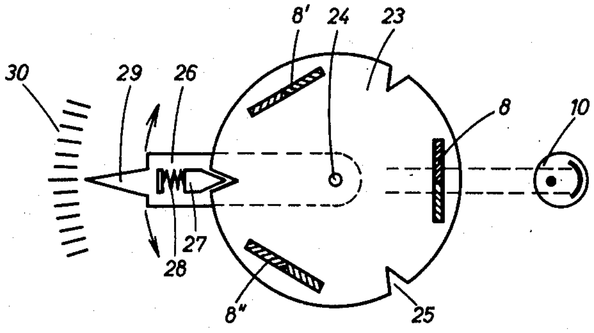

In the arrangement of FIG. 6, three correction filters 8' and 8'' are mounted on a rotatable disc 23 which in turn is mounted for rotation on an axle 24, and is provided with dwell notches 25 at its periphery. The filter colors are blue-red, yellow-blue green, and blue-green in accord with the requirements for red, yellow, blue extraction, as set forth in Table I. The light beam emanating from the filter 5 (FIG. 1) passes through the particular one of the three correction filters which confronts the photocell 10.

A lever 26 is pivotally mounted on the axle 24 and is provided with a pawl member 27, which is urged to engage the disc 23 by means of a compression spring 28. The disc and lever form a unitarily rotatable device upon engagement of the pawl 27 with any one of the notches 25. The lever is provided with a suitable pointer 29 which cooperates with a fixed scale 30 to indicate the deviation angle of the lever.

The device of FIG. 6 is employed to select and exchange the filters confronting the photocell 10 by operation of the lever 26 to engagement of the selected one of the notches 25, and reversion of the lever and the disc to the indicated neutral position. Further, the lever is operated so as to deviate slightly from its indicated position as read on the scale 30, so as to permit passage of the light beam to greater or lesser extent through the partial filters constituting the correction filters. In this manner, the balance of the black colors and the white colors may be varied.

An alternative scheme for extracting black, in accordance with the invention is predicated on the selection of the larger of two potentials which are derived from the light transmission of an orange-red and a blue-green filter.

The red filter extract, which is practically equivalent to the corrected blue extract, delivers the warm colors red, orange and yellow with approximately the same brightness as white. These colors do not contain any black. The cold colors appear as substantially black in this extract, that is without voltage amplitude. Therefore, it is necessary to make a further extract with a green-blue filter. This delivers the cold colors with no zero voltage amplitude, which although appreciably below the white amplitude, are nevertheless appreciably above the black amplitude. Further, the warm colors behave as though they were black.

In accordance with the invention, the two filters supply separate channels with the available colorimetric values in the form of the usual photoelectric potentials. Electronic means are provided for selecting the greater of the two available potentials and to utilize the same for the generation of the black extract. For example, let the potentials for a white pattern color tone be equal in both channels at 100%; accordingly black also appears equally in both channels at about 4%, and white and black are transmitted at 100% and 4% respectively. Red appears at 95% in the red channel and at 4% in the blue channel. Accordingly red is selected at 95% amplitude and is transmitted practically free of black. Blue appears at 50% in the blue channel and at 4% in the red channel and is therefore transmitted at 50% amplitude that is not quite free of black.

As the color tones green and violet have even lower amplitudes in the range from 15% to 35%, there is provided according to a further aspect of the invention circuitry for correcting the blue-green filter extract potential in accordance with the orange-red filter extract potential, prior to application of both extracts to the electronic selection means.

The corrected blue filter channel signal is corrected to a reasonably sufficient extent. The blue-amplitude is now approximately 100% and is very nearly the same as the white-amplitude. Green attains 75% and violet approximately 50%. If desired, the residual black value in the latter two colors may be further diminished by the usual gradation adjusting means contained in the reproduction means to which the output signals of the herein described apparatus are fed, as described.

An embodiment of the combined selection and correction means is illustrated in FIG. 7, to which reference is now made. The circuitry of FIG. 7 incorporates the circuitry of FIG. 1., but for simplicity the elements in back of the photocells 7 and 10 are omitted. It is assumed that in this instance the filter 5 of FIG. 1 is the green-blue filter and the filter 8 is the red-orange filter. The output signal II available from the photocell 10 corresponds to a properly corrected one for the colors red, orange and yellow. The signal I available at the output of the photocell 7 corresponds to an uncorrected extract, in which the colors green, blue and violet fail to attain the value of white. Since these latter colors also contain black, they are subjected to a correction in accordance with the signal II, prior to application to the selection means. This is accomplished by feeding the signal II to the stage 12, whose output is applied to the stage 11 as previously. The stage 12 or 11 is arranged to have a non-linear character such that in the presence of white in the master pattern picture, the color values I*a* and II are of equal magnitude. As a result, the several color signals will assume values approximating that of white in one or the other of the signals I*a* or II. The latter two signals, in the form of direct voltages or equiphase alternating voltages, are applied to the anodes of diodes 31 and 32 whose cathodes are connected together through a common load resistor 33 to ground. Resistors 31*a* and 32*a* connect from the respective diode anodes to ground. The larger of the two potentials I*a* and II is transmitted through its respective diode and at the same time block transmission of the smaller potential through its respective diode. The thus selected greater potential can be derived from the resistor 33 to serve as black extract for purposes of picture reproduction.

Thus it will be seen that in accordance with the invention there have been provided simple and efficient method and means providing color extracts suitable corrected for reproducing prints of a master pattern picture. While several preferred embodiments have been illustrated it should be understood that the invention is not limited thereto, as further modifications may occur to those skilled in the art. Accordingly it is intended that such modifications as fall within the spirit and scope of the appended claims, be considered as embraced by the present invention.

What is claimed as new and desired to be secured by Letters Patent is:

1. In the art of reproducing a multicolor copy picture from a multicolor pattern picture by point-by-point, line-by-line scanning of said pattern picture by subjecting said pattern to illumination, a method generating a corrected color extract signal to serve as control signal for the color reproducing means, said method comprising the steps of projecting the beam of light emanating from said pattern as a result of said illumination onto a first filter capable of transmitting colors of a preselected group and of reflecting other colors, directing the reflected light through a second color selective filter, generating electrical potentials in accordance with the light intensities passed by said filter respectively, and modifying the electrical signal derived from said first filter in accordance with the signal derived from said second filter.

2. In the art of reproducing a multicolor copy picture from a multicolor pattern picture by point-by-point, line-by-line scanning of said pattern picture by subjecting said pattern to illumination, a method generating a corrected red color extract signal to serve as control signal for the color reproducing means, said method comprising the steps of projecting the beam of light emanating from said pattern as a result of said illumination onto a green filter, directing the reflected light through a second color selective filter composed of adjacent red and blue partial filters; generating electrical potentials in accordance with the light intensities passed by said filters respectively, and modifying the electrical signal derived from said green filter in accordance with the signal derived from said second filter.

3. In the art of reproducing a multicolor copy picture from a multicolor pattern picture by point-by-point, line-by-line scanning of said pattern picture by subjecting said pattern to illumination, a method generating a corrected yellow color extract signal to serve as control signal for the color reproducing means, said method comprising the steps of projecting the beam of light emanating from said pattern as a result of said illumination onto a blue filter; directing the reflected light through a second color selective filter composed of adjacent yellow and blue-green partial filters; generating electrical potentials in accordance with the light intensities passed by said filters respectively, and modifying the electrical signal derived from said blue filter in accordance with the signal derived from said second filter.

4. In the art of reproducing a multicolor copy picture from a multicolor pattern picture by point-by-point, line-by-line scanning of said pattern picture by subjecting said pattern to illumination, a method generating a corrected blue color extract signal to serve as control signal for the color reproducing means, said method comprising the steps of projecting the beam of light emanating from said pattern as a result of said illumination onto a red filter; directing the reflected light through a second color selective filter composed of adjacent blue-green partial filters; generating electrical potentials in accordance with the light intensities passed by said filters respectively, and modifying the electrical signal derived from said red filter in accordance with the signal derived from said second filter.

5. In the art of reproducing a multicolor copy picture from a multicolor pattern picture by point-by-point, line-by-line scanning of said pattern picture by subjecting said pattern to illumination, a method generating a corrected black color extract signal to serve as control signal for the color reproducing means, said method comprising the steps of projecting the beam of light emanating from said pattern as a result of said illumination onto a green-blue filter; directing the reflected light through a second color selective filter of red color; generating electrical potentials in accordance with the light intensities passed by said filters respectively, and modifying the electrical signal derived from said green-blue filter in accordance with the signal derived from said second filter.

6. In apparatus for reproducing a multicolor copy picture from a multicolor pattern picture by point-by-point, line-by-line scanning of said pattern picture by subjecting said pattern to illumination; means for generating a corrected color extract signal to serve as control signal for the color reproducing means comprising a first color selective filter disposed in the path of light emanating from said pattern as a result of said illumination and capable of transmitting colors of a preselected group and of reflecting other colors; a first photoelectric means receiving light transmitted by said first filter and producing a first electrical signal in accordance with the intensity of a transmitted light; a second color selective filter disposed in the path of light reflected from said first filter adapted to transmit the incident colors with predetermined intensity; a second photoelectric means receiving the light transmitted by said second filter and generating a second electrical signal in accordance with the light intensity received thereby; and means for modulating said first electrical signal with said second electrical signal to provide a corrected color extract signal.

7. In apparatus for reproducing a multicolor copy picture from a multicolor pattern picture by point-by-point, line-by-line scanning of said pattern picture by subjecting said pattern to illumination; means for generating a corrected color extract signal to serve as control signal for the color reproducing means comprising a first color selective filter disposed in the path of light emanating from said pattern as a result of said illumination and capable of transmitting colors of a preselected group and of reflecting other colors; a first photoelectric means receiving light transmitted by said first filter and producing a first electrical signal in accordance with the intensity of a transmitted light; a second color selective filter disposed in the path of light reflected from said first filter adapted to transmit the incident colors with predetermined intensity; a second photoelectric means receiving the light transmitted by said second filter and generating a second electrical signal in accordance with the light intensity received thereby; an amplifier stage for amplifying said second signal; and a modulator stage receiving said first and amplified signals and providing a corrected color extract signal representing said first signal modulated in accordance with said amplified signal, one of said stages being non-linear.

8. In apparatus for reproducing a multicolor copy picture from a multicolor pattern picture by point-by-point, line-by-line scanning of said pattern picture by subjecting said pattern to illumination; means for generating a corrected color extract signal to serve as control signal for the color reproducing means comprising a first color selective filter disposed in the path of light emanating from said pattern as a result of said illumination and capable of transmitting colors of the white color group and of reflecting colors of the black color group; a first photoelectric means receiving light transmitted by said first filter and producing a first electrical signal in accordance with the intensity of a transmitted light; a second color selective filter disposed in the path of light reflected from said first filter adapted to transmit the incident colors with predetermined intensity; a second photoelectric means receiving the light transmitted by said second filter and generating a second electrical signal in accordance with the light intensity received thereby; an amplifier stage for amplifying said second signal; a modulator stage receiving said first and amplified signals and providing a partly corrected color extract signal representing said first signal modulated in accordance with said amplified signal, one of said stages being non-linear; means for generating a signal representing the difference of the first and second signals; a limiter stage receiving the difference signal as an input signal; and means to combine the output signal of said limiter with said partly corrected signal to provide a substantially fully corrected color extract signal.

9. In apparatus for reproducing a multicolor copy picture from a multicolor pattern picture by point-by-point, line-by-line scanning of said pattern picture by subjecting said pattern to illumination; means for generating a corrected color extract signal to serve as control signal for the color reproducing means comprising a first color selective filter disposed in the path of light emanating from said pattern as a result of said illumination and capable of transmitting colors of the white color group and of reflecting colors of the black color group; a first photoelectric means receiving light transmitted by said first filter and producing a first electrical signal in accordance with the intensity of a transmitted light; a second color selective filter disposed in the path of light reflected from said first filter adapted to transmit the incident colors with predetermined intensity; a second photoelectric means receiving the light transmitted by said second filter and generating a second electrical signal in accordance with the light intensity received thereby; an amplifier stage for amplifying said second signal; a modulator stage receiving said first and applied signals and providing a partly corrected color extract signal representing said first signal modulated in accordance with said amplified signal, one of said stages being non-linear; means for generating a signal representing the difference of the first and second signals; a limiter stage receiving the difference signal and a fraction of said second signal as input signals; and means to combine the output signal of said limiter with said partly corrected signal to provide a substantially fully corrected color extract signal.

10. In apparatus for reproducing a multicolor copy picture from a multicolor pattern picture by point-by-point, line-by-line scanning of said pattern picture by subjecting said pattern to illumination; means for generating a corrected color extract signal to serve as control signal for the color reproducing means comprising a first color selective filter disposed in the path of light emanating from said pattern as a result of said illumination and capable of transmitting colors of the white color group and of reflecting colors of the black color group; a first photoelectric means receiving light transmitted by said first filter and producing a first electrical signal in accordance with the intensity of a transmitted light; a second color selective filter disposed in the path of light reflected from said first filter adapted to transmit the incident colors with predetermined intensity; a second photoelectric means receiving the light transmitted by said second filter and generating a second electrical signal in accordance with the light intensity received thereby; an amplifier stage for amplifying said second signal; a modulator stage receiving said first and amplified signals and providing a corrected color extract signal representing said first signal modulated in accordance with said amplified signal, one of said stages being non-linear; a limiter stage; means for applying said first signal as a variable bias signal to said limiter stage for variable control of its threshold limiting level; means for applying said second signal as the to be limited input signal to said limiter stage; and means for applying the limiter signal as an additional modulating signal to said modulator stage.

11. In apparatus for reproducing a multicolor copy picture from a multicolor pattern picture by point-by-point, line-by-line scanning of said pattern picture by subjecting said pattern to illumination; means for generating a corrected color extract signal to serve as control signal for the color reproducing means comprising a first color selective filter disposed in the path of light emanating from said pattern as a result of said illumination and capable of transmitting colors of the white color group and of reflecting colors of the black color group; a first photoelectric means receiving light transmitted by said first filter and producing a first electrical signal in accordance with the intensity of a transmitted light; a second color selective filter disposed in the path of light reflected from said first filter adapted to transmit the incident colors with predetermined intensity; a second photoelectric means receiving the light transmitted by said second filter and generating a second electrical signal in accordance with the light intensity received thereby; an amplifier stage for amplifying said second signal; a modulator stage receiving said first and amplified signals and providing a corrected color extract signal representing said first signal modulated in accordance with said amplified signal, one of said stages being non-linear; a limiter stage; means for applying said first signal as a variable bias signal to said limiter stage for variable control of its threshold limiting level; means for applying one of the aforesaid signals other than said first signal as the to be limited input signal to said limiter stage; and means for applying the limiter output signal as an additional modulating signal to said modulator stage.

12. In apparatus for reproducing a multicolor copy picture from a multicolor pattern picture by point-by-point, line-by-line scanning of said pattern picture by subjecting said pattern to illumination; means for generating a corrected color extract signal to serve as control signal for the color reproducing means comprising a first color selective filter disposed in the path of light emanating from said pattern as a result of said illumination and capable of transmitting colors of the white color group and of reflecting colors of the black color group; a first photoelectric means receiving light transmitted by said first filter and producing a first alternating electrical signal in accordance with the intensity of a transmitted light; a second color selective filter disposed in the path of light reflected from said first filter adapted to transmit the incident colors with predetermined intensity; a second photoelectric means receiving the light transmitted by said second filter and generating a second alternating electrical signal in accordance with the light intensity received thereby; an amplifier stage for amplifying said second signal; a modulator stage receiving said first and amplified signals and providing a corrected color extract signal representing said first signal modulated in accordance with said amplified signal, one of said stages being non-linear; a limiter stage; means for rectifying said first signal; means for applying the rectified signal as a variable bias signal to said limiter stage for variable control of its threshold limiting level; means for applying said second signal as the to be limited input signal to said limiter stage; and means for applying the limiter output signal as an additional modulating signal to said modulator stage.

13. In apparatus for reproducing a multicolor copy picture from a multicolor pattern picture by point-by-point, line-by-line scanning of said pattern picture by subjecting said pattern to illumination; means for generating a corrected color extract signal to serve as control signal for the color reproducing means comprising a first color selective filter disposed in the path of light emanating from said pattern as a result of said illumination and capable of transmitting colors of the white color group and of reflecting colors of the black color group; a first photoelectric means receiving light transmitted by said first filter and producing a first alternating electrical signal in accordance with the intensity of a transmitted light; a second color selective filter disposed in the path of light reflected from said first filter adapted to transmit the incident colors with predetermined intensity; a second photoelectric means receiving the light transmitted by said second filter and generating a second alternating electrical signal in accordance with the light intensity received thereby; an amplifier stage for amplifying said second signal; a modulator stage receiving said first and amplified signals and providing a corrected color extract signal representing said first signal modulated in accordance with said amplified signal, one of said stages being non-linear; a limiter stage; means for rectifying said first signal; means for applying the rectified signal as a variable bias signal to said limiter stage for variable control of its threshold limiting level; means for applying one of the aforesaid signals other than said first signal as the to be limited input signal to said limiter stage; and means for applying the limiter output signal as an additional modulating signal to said modulator stage.

14. In apparatus for reproducing a multicolor copy picture from a multicolor pattern picture by point-by-point, line-by-line scanning of said pattern picture by subjecting said pattern to illumination; means for generating a corrected color extract signal to serve as control signal for the color reproducing means comprising a first color selective filter disposed in the path of light emanating from said pattern as a result of said illumination and capable of transmitting colors of the white color group and of reflecting colors of the black color group; a first photoelectric means receiving light transmitted by said first filter and producing a first alternating electrical signal in accordance with the intensity of a transmitted light; a second color selective filter disposed in the path of light reflected from said first filter adapted to transmit the incident colors with predetermined intensity; a second photoelectric means receiving the light transmitted by said second filter and generating a second alternating electrical signal in accordance with the light intensity received thereby; an amplifier stage for amplifying said second signal; a modulator stage receiving said first and amplified signals and providing a partly corrected color extract signal representing said first signal modulated in accordance with said amplified signal, one of said stages being non-linear; transformer receiving said first and second signals and delivering an output signal representing the difference thereof; means for rectifying said difference signal; a limiting stage receiving said rectified signal as an input signal; and means for rectifying said partially corrected signal, the latter rectified signal being applied to the output of said limiting means, to serve, in combination with the output of said limiting means, as a substantially completely corrected signal.

15. In apparatus for reproducing a multicolor copy picture from a multicolor pattern picture by point-by-point, line-by-line scanning of said pattern picture by subjecting said pattern to illumination; means for generating a corrected black color extract signal to serve as control signal for the color reproducing means comprising a first color selective filter composed of green and blue partial filters disposed in the path of light emanating from said pattern as a result of said illumination and capable of transmitting colors of the white color group and of reflecting colors of the black color group; a first photoelectric means receiving light transmitted by said first filter and producing a first electrical signal in accordance with the intensity of a transmitted light; a second color selective filter composed of red and orange partial filters disposed in the path of light reflected from said first filter adapted to transmit the incident colors with predetermined intensity; a second photoelectric means receiving the light transmitted by said second filter and generating a second electrical signal in accordance with the light intensity received thereby; an amplifier stage for amplifying said second signal; a modulator stage receiving said first and amplified signals and providing a partly corrected color extract signal representing said first signal modulated in accordance with said amplified signal, one of said stages being non-linear; and selection means receiving said second and modulated signals and transmitting the greater thereof, the transmitted signal serving as the substantially fully corrected black extract signal.

16. In apparatus for reproducing a multicolor copy picture from a multicolor pattern picture by point-by-point, line-by-line scanning of said pattern picture by subjecting said pattern to illumination; means for generating a corrected black color extract signal to serve as control signal for the color reproducing means comprising a first color selective filter composed of green and blue partial filters disposed in the path of light emanating from said pattern as a result of said illumination and capable of transmitting colors of the white color group and of reflecting colors of the black color group; a first photoelectric means receiving light transmitted by said first filter and producing a first electrical signal in accordance with the intensity of a transmitted light; a second color selective filter composed of red and orange partial filters disposed in the path of light reflected from said first filter adapted to transmit the incident colors with predetermined intensity; a second photoelectric means receiving the light transmitted by said second filter and generating a second electrical signal in accordance with the light intensity received thereby; an amplifier stage for amplifying said second signal; a modulator stage receiving said first and amplified signals and providing a partly corrected color extract signal representing said first signal modulated in accordance with said amplified signal, one of said stages being non-linear; and selection means receiving said second and modulated signals and transmitting the greater thereof, the transmitted signal serving as the substantially fully corrected black extract signal, said selection means comprising a pair of rectifying circuits receiving the second and modulated signals and having a common output circuit, whereby the rectifying circuit receiving the greater of these two signals transmits the same and at the same time blocks transmission of the lesser signal through the other rectifying means.

17. In apparatus for reproducing a multicolor copy picture from a multicolor pattern picture by point-by-point, line-by-line scanning of said pattern picture by subjecting said pattern to illumination; means for generating a corrected color extract signal to serve as control signal for the color reproducing means comprising a first color selective filter means disposed in the path of light emanating from said pattern as a result of said illumination and capable of transmitting colors of a preselected group and of reflecting other colors; a first photoelectric means receiving light transmitted by said first filter means and producing a first electrical signal in accordance with the intensity of a transmitted light; a second color selective filter means disposed in the path of light reflected from said first filter means adapted to transmit the incident colors with predetermined intensity, said second filter means including a plurality of filters sequentially insertable into the path of light reflected by said first filter means; a second photoelectric means receiving the light transmitted by said second filter means and generating a second electrical signal in accordance with the light intensity received thereby; an amplifier stage for amplifying said second signal; and modulator stage receiving said first and amplified signals and providing a corrected color extract signal representing said first signal modulated in accordance with said amplified signal, one of said stages being non-linear.

18. In apparatus for reproducing a multicolor copy picture from a multicolor pattern picture by point-by-point, line-by-line scanning of said pattern picture by subjecting said pattern to illumination; means for generating a corrected color extract signal to serve as control signal for the color reproducing means comprising a first color selective filter means disposed in the path of light emanating from said pattern as a result of said illumination and capable of transmitting colors of a preselected group and of reflecting other colors; a first photoelectric means receiving light transmitted by said first filter means and producing a first electrical signal in accordance with the intensity of a transmitted light; a second color selective filter means disposed in the path of light reflected from said first filter means adapted to transmit the incident colors with predetermined intensity, said second filter means including three filters sequentially insertable into the path of light reflected by said first filter means, composed respectively of blue and red, yellow and blue green, and blue and green partial filters; a second photoelectric means receiving the light transmitted by said second filter means and generating a second electrical signal in accordance with the light intensity received thereby; an amplifier stage for amplifying said second signal; and a modulator stage receiving said first and amplified signals and providing a corrected color extract signal representing said first signal modulated in accordance with said amplified signal, one of said stages being non-linear.

19. An apparatus for reproducing a multicolor copy picture from a multicolor pattern picture by point-by-point, line-by-line scanning of said pattern picture by subjecting said pattern to illumination; said apparatus comprising means for generating a corrected color extract signal to serve as control signal for the color reproducing means comprising a first color selective filter disposed in the path of light emanating from said pattern as a result of said illumination and capable of transmitting colors of a preselected group and of reflecting other colors; a first photoelectric means receiving light transmitted by said first filter and producing a first electrical signal in accordance with the intensity of a transmitted light; a second photoelectric means ultimately receiving light reflected by said first filter and generating a first electrical signal in accordance with the light intensity received thereby; and means for modulating said first electrical signal with said second electrical signal to provide a corrected color extract signal; and means for sequentially inserting second filters into the light path intermediate said first filter and second photoelectric means, said second filters having different preselected color transmissivities, whereby said corrected color extract signal is subjected to a sequence of different corrections and the ultimately reproduced multicolor copy is rendered particularly pleasing to the eye.

References Cited in the file of this patent

UNITED STATES PATENTS

| | | |
|---|---|---|
| 1,450,061 | Coblentz | Mar. 27, 1923 |
| 1,458,165 | Coblentz | June 12, 1923 |
| 2,193,315 | Evelyn | Mar. 12, 1940 |
| 2,337,736 | Cawein | Dec. 28, 1943 |
| 2,478,598 | Somers | Aug. 9, 1949 |
| 2,696,750 | Hunter | Dec. 14, 1954 |
| 2,802,390 | Nimeroff | Aug. 13, 1957 |
| 2,856,811 | Kaye | Oct. 21, 1958 |
| 2,910,909 | Stone et al. | Nov. 3, 1959 |
| 2,968,214 | Kilminster | Jan. 17, 1961 |
| 3,041,932 | Kilminster | July 3, 1962 |